United States Patent
Tian et al.

(10) Patent No.: US 12,415,176 B1
(45) Date of Patent: Sep. 16, 2025

(54) PREPARATION METHOD OF NI-BASED HIGH-ENTROPY OXIDE CATALYST AND ITS APPLICATION IN CARBON DIOXIDE REFORMING OF METHANE TO PREPARE SYNGAS

(71) Applicant: East China University of Science and Technology, Shanghai (CN)

(72) Inventors: Chengcheng Tian, Shanghai (CN); Zhengcheng Wang, Hangzhou (CN); Xiang Zhu, Chengdu (CN); Qiying Zheng, Tianjin (CN); Cong Yuan, Yancheng (CN); Hualin Wang, Shanghai (CN)

(73) Assignee: East China University of Science and Technology, Shanghai (CN)

( * ) Notice: Subject to any disclaimer, the term of this patent is extended or adjusted under 35 U.S.C. 154(b) by 0 days.

(21) Appl. No.: 19/076,057

(22) Filed: Mar. 11, 2025

(30) Foreign Application Priority Data

Mar. 15, 2024 (CN) .......................... 202410299492.2

(51) Int. Cl.
*B01J 23/80* (2006.01)
*B01J 37/00* (2006.01)
(Continued)

(52) U.S. Cl.
CPC .......... *B01J 23/80* (2013.01); *B01J 37/0036* (2013.01); *B01J 37/04* (2013.01); *B01J 37/08* (2013.01);
(Continued)

(58) Field of Classification Search
None
See application file for complete search history.

(56) References Cited

FOREIGN PATENT DOCUMENTS

CN 116078393 A * 5/2023 ............ B01J 23/002

OTHER PUBLICATIONS

Li et al, CN 116078393 A, English Translation from FIT (Year: 2023).*

(Continued)

*Primary Examiner* — Colin W. Slifka
(74) *Attorney, Agent, or Firm* — Hemisphere Law, PLLC; Zhigang Ma

(57) ABSTRACT

A preparation method of a Ni-based high-entropy oxide catalyst and its application in the preparation of syngas by carbon dioxide ($CO_2$) reforming of methane ($CH_4$) is provided, and it relates to the technical field of preparation of environmental catalytic materials. The catalyst is prepared by high-energy ball milling method. Using reversible Ni particles with high content as the active site of $CH_4$ gas, other metals introduced by high-entropy strategy greatly reduce the carbon generated from $CH_4$ cracking while activate $CO_2$. The prepared catalyst not only effectively overcomes the problem of poor stability of the Ni-based catalyst in $CO_2$ reforming of $CH_4$, but also promotes activation of $CO_2$ and improves the efficiency of $CO_2$ reforming of $CH_4$ reaction. The provided preparation method of the high-entropy oxide catalyst is simple, stable, economical and reliable, and has a good development prospect in the industrial application field of $CO_2$ reforming of $CH_4$ technology.

5 Claims, 2 Drawing Sheets

(51) Int. Cl.
  *B01J 37/04* (2006.01)
  *B01J 37/08* (2006.01)
  *B01J 37/18* (2006.01)
  *C01B 3/40* (2006.01)

(52) U.S. Cl.
  CPC ............. *B01J 37/18* (2013.01); *C01B 3/40* (2013.01); *C01B 2203/0238* (2013.01); *C01B 2203/1058* (2013.01); *C01B 2203/1076* (2013.01); *C01B 2203/1241* (2013.01)

(56) References Cited

OTHER PUBLICATIONS

CNIPA, Notification of First Office Action for CN202410299492.2, Nov. 30, 2024.
East China University of Science and Technology (Applicant), Replacement claims (allowed) of CN202410299492.2, Dec. 9, 2024.
CNIPA, Notification to grant patent right for invention in CN202410299492.2, Jan. 2, 2025.

* cited by examiner

PREPARATION METHOD OF NI-BASED HIGH-ENTROPY OXIDE CATALYST AND ITS APPLICATION IN CARBON DIOXIDE REFORMING OF METHANE TO PREPARE SYNGAS

CROSS-REFERENCE TO RELATED APPLICATION

This application claims priority to Chinese Patent Application No. 202410299492.2, filed Mar. 15, 2024, which is herein incorporated by reference in its entirety.

TECHNICAL FIELD

The disclosure relates to the technical field of preparation of environmental catalytic materials, and more particularly to a preparation method of nickel (Ni)-based high-entropy oxide catalyst and its application in carbon dioxide ($CO_2$) reforming of methane ($CH_4$) to prepare syngas.

BACKGROUND

Large-scale utilization of fossil energy by human beings in today's society has led to a large amount of $CO_2$ emissions, and the excessive amount of $CO_2$ in the atmosphere has triggered a series of environmental problems, such as the aggravation of the greenhouse effect, the increase in the global average temperature, the melting of glaciers, and the rise of the sea level and so on. Converting $CO_2$ into carbon-containing chemicals can effectively reduce the $CO_2$ content in the atmosphere. Among them, the $CO_2$ reforming of $CH_4$ reaction can simultaneously eliminate two greenhouse gases, $CO_2$ and $CH_4$, and convert them into syngas to further synthesize into other high-value chemicals.

A technology of $CO_2$ reforming of $CH_4$ has been widely concerned by scholars at home and abroad, and the core of this technology is to develop catalysts capable of converting $CO_2$ and $CH_4$ with high efficiency. In current research results, noble metal catalysts have good performance in the $CO_2$ reforming of $CH_4$ reaction and can maintain their activity for a long time, but their expensive raw material cost limits their applications in industry. In addition, Ni-based catalysts have excellent catalytic performance for the $CO_2$ reforming of $CH_4$ reaction, and their lower price compared with the noble metals makes them more advantageous for industrial applications. However, the Ni-based catalysts are often deactivated during reaction process by deposited carbon covering the surface of active site of the catalysts.

In order to solve the problem of the short lifetime of the catalysts, researchers find that doping rare earth elements in the Ni-based catalysts, limiting the size of Ni nanoparticles, and modulating the interaction between carrier and active metal are effective measures, thus some Ni-based extended catalysts for the $CO_2$ reforming of $CH_4$ reaction are developed. Previously developed catalysts are usually synthesized by solution synthesis method, the method requires a series of cumbersome operations such as mixing, dissolving, stirring, washing, drying, and calcining, not only the preparation process is complex, but also the operation is uncontrollable and the yield of the product is low.

Thus, the technology in the related art needs to be further improved.

SUMMARY

One of objects of the disclosure is to provide a preparation method of Ni-based high-entropy oxide catalyst for $CO_2$ reforming of $CH_4$. The catalyst is obtained by using a solid high-energy ball milling method to obtain a precursor, followed by high temperature calcination of the precursor, and finally calcining in a reducing gas. The prepared catalyst is applied to the $CO_2$ reforming of $CH_4$ reaction, which has high efficiency and stable catalytic performance.

To achieve the above object, the disclosure adopts the following technical solutions.

Specifically, a preparation method of Ni-based high-entropy oxide catalyst includes the following steps:
(1) mixing any four powders of the respective metals selected from the group consisting of magnesium (Mg), aluminum (Al), zinc (Zn), manganese (Mn), cobalt (Co), copper (Cu), molybdenum (Mo) and iron (Fe) with complex (i.e., complexing agent) and metal Ni to obtain a mixed product, and then ball milling the mixed product at a frequency of 20-50 hertz (Hz) for 30-60 minutes (min) to obtain a precursor;
(2) calcining the precursor obtained in the step (1) at high temperature to obtain Ni-based high-entropy oxide catalyst powder; and
(3) calcining the Ni-based high-entropy oxide catalyst powder obtained in the step (2) in a reducing gas to form reversible Ni particles, so as to obtain the Ni-based high-entropy oxide catalyst.

In the above-described preparation method of the Ni-based high-entropy oxide catalyst, in the step (1), the metal source is one or more selected from the group consisting of an oxide, chloride, acetate, nitrate, carbonate, sulfate, sulfite, ammonium oxalate, citrate and gluconate.

In the above-described preparation method of the Ni-based high-entropy oxide catalyst, in the step (1), a molar ratio of metal Ni to each of the above-mentioned four metals is in a range of 2.6:1 to 18:1.

In the above-described preparation method of the Ni-based high-entropy oxide catalyst, in the step (1), the complex is one or more selected from the group consisting of sodium citrate, citric acid, diethanolamine, ethylenediamine tetraacetic acid, acetylacetone, dithizone and sodium triphosphate.

In the above-described preparation method of the Ni-based high-entropy oxide catalyst, in the step (2), high-temperature calcination temperature is in a range of 850-1200 Celsius degrees (° C.), calcination time is in a range of 1-6 hours (h), and heating rate during calcination is in a range of 1-10 Celsius degrees per minute (° C./min).

In the above-described preparation method of the Ni-based high-entropy oxide catalyst, in the step (3), the reducing gas is hydrogen ($H_2$), $CH_4$ or carbon monoxide (CO), calcination temperature is in a range of 200-850° C., and calcination time is in a range of 20-200 min.

Another object of the disclosure is to provide a catalyst obtained by the above-mentioned preparation method of the Ni-based high-entropy oxide catalyst.

Further object of the disclosure is to provide an application of the catalyst in the preparation of syngas by $CO_2$ reforming of $CH_4$, the application has a volume ratio of $CO_2$ to $CH_4$ in a range of 0.8 to 1.2, a reaction temperature in a range of 650 to 850° C., a reaction pressure in a range of 0 to 2 megapascal (MPa), and a space velocity of the reaction feed gas in a range of 3,000 to 60,000 milliliters per gram per hour ($mL \cdot g^{-1} \cdot h^{-1}$).

Compared with the related art, the disclosure has the following beneficial technical effects.

(1) The catalyst of the disclosure has wide sources of raw materials, simple preparation process, short time consumption, easy and accurate control of preparation conditions, and good repeatability.

(2) In the disclosure, under the reaction conditions, reversible Ni particles with high content are the active site of $CH_4$, other metals in the high-entropy oxides as the basic site can adsorb and activate $CO_2$ molecules, rapidly release a large amount of reactive oxygen to combine with the carbon generated by $CH_4$ cracking to form CO. The catalyst can not only promote the positive reforming reaction, but also greatly reduce carbon deposition, and thus improve its stability. In addition, the five metals form a single-phase high-entropy oxide, and the high-entropy effect caused by disordered chemical composition and lattice distortion significantly slows down the diffusion rate of their metal elements, further improving the high-temperature stability of the catalyst.

(3) The disclosure can change the types and compositions of precursor metal salts in the preparation of the high-entropy oxide catalyst, and prepare the high-entropy oxide catalysts with different active centers. The catalysts can be widely applied to other reaction catalytic systems and have good general applicability.

(4) The catalysts prepared by the disclosure show high efficiency and stable catalytic performance, are economical in preparation cost and environment-friendly, and have a good application prospect in catalyzing $CO_2$, $CH_4$ and other gases.

DETAILED DESCRIPTION OF EMBODIMENTS

The disclosure proposes a preparation method of a Ni-based high-entropy oxide catalyst and its application in preparation of syngas by $CO_2$ reforming of $CH_4$. In order to make advantages and technical solutions of the disclosure clearer and more explicit, the disclosure is further described in combination with specific embodiments.

All of raw materials described in the disclosure are commercially available.

All of methods described in the disclosure are conventional treatments unless otherwise specified.

Embodiment 1

A preparation method of a Ni-based high-entropy oxide catalyst specifically includes the following steps.

Step (1), the respective powders of metal sources of Mg, Co, Cu and Zn are mixed with metal Ni and a complex to obtain a mixed product, then the mixed product is performed ball milling to obtain a precursor.

Step (2), the precursor obtained in the step (1) is calcined at high temperature to obtain Ni-based high-entropy oxide catalyst powder.

Step (3), the Ni-based high-entropy oxide catalyst powder obtained in the step (2) is calcined in a reducing gas to form reversible Ni particles, so as to obtain the Ni-based high-entropy oxide catalyst.

In the step (1), the metal source is oxide.

In the step (1), a molar ratio of metal Ni to each of the other metals (i.e., Mg, Co, Cu and Zn) is 6:1

In the step (1), the complex is citric acid.

In the step (1), ball milling frequency is 20 Hz and ball milling time is 60 min.

In the step (2), heating rate of calcination is 2° C./min, calcination temperature is 900° C., and calcination time is 2 h.

In the step (3), the reducing gas is $H_2$, calcination temperature is 700° C. and calcination time is 120 min.

The prepared catalyst is denoted as HEO-Ni. In the HEO-Ni, the molar ratio of Ni is 60%, and the molar ratio of the remaining four metals is 40%.

Figure 1:
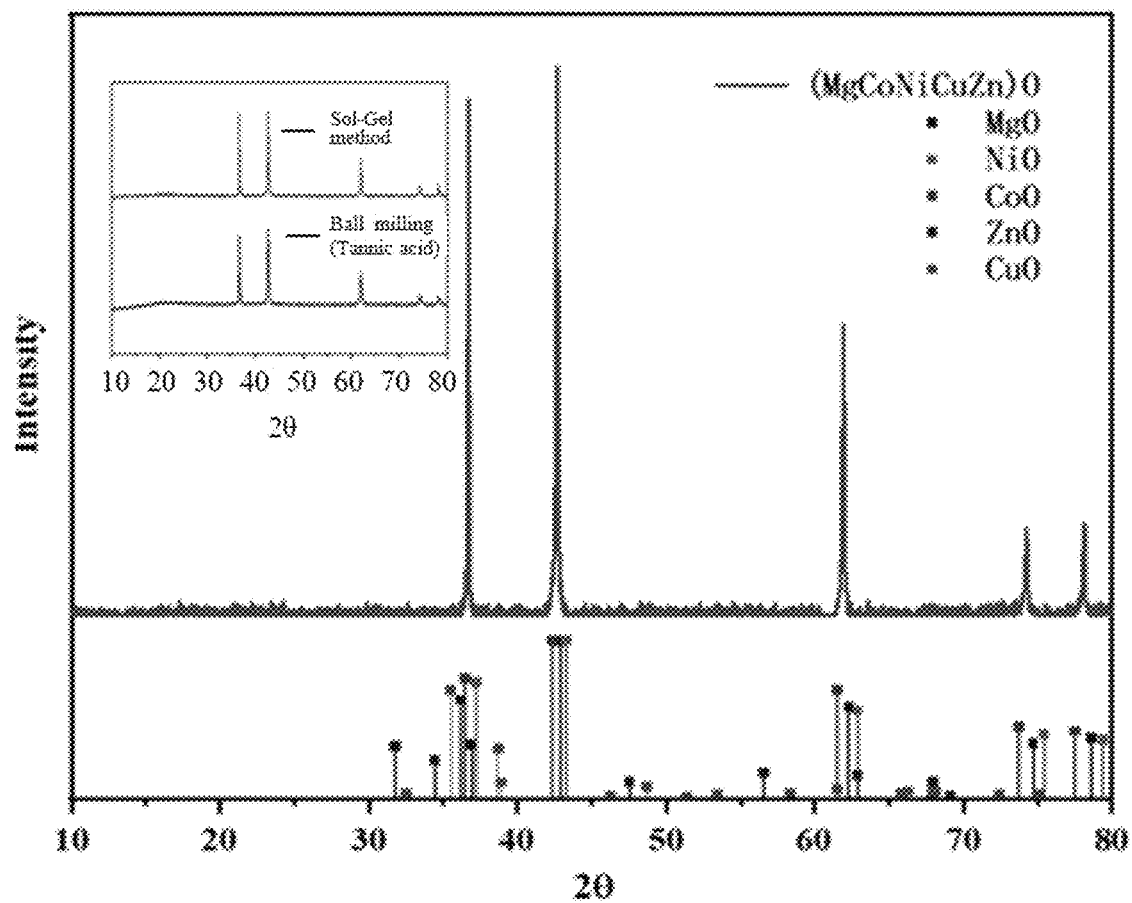
FIG. 1 illustrates an X-ray diffraction (XRD) pattern of a high-entropy oxide catalyst.
Figure 2:
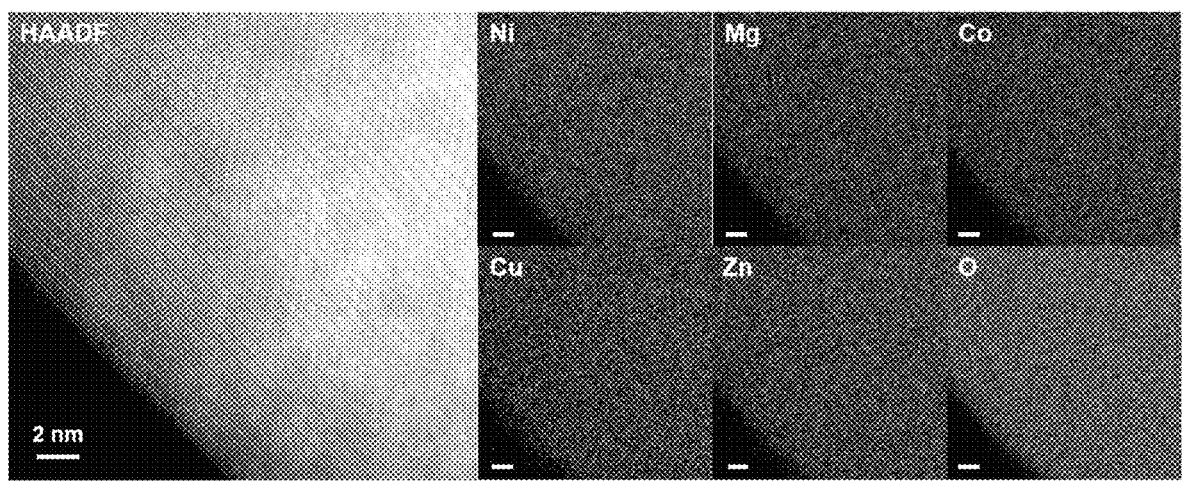
FIG. 2 illustrates an energy-dispersive X-ray spectroscopy (EDX) pattern of the high-entropy oxide catalyst.

The XRD pattern of the Ni-based high-entropy oxide catalyst prepared in this embodiment is shown in FIG. 1, and the EDX pattern of the Ni-based high-entropy oxide catalyst is shown in FIG. 2.

Embodiment 2

A preparation method of a Ni-based high-entropy oxide catalyst of the embodiment 2 is distinguished from the embodiment 1 in that the metal source in the step (1) is acetate.

In the step (1), the molar ratio of metal Ni to each of the other metals (i.e., Mg, Co, Cu and Zn) is 2.6:1.

In the step (1), the complex in is sodium citrate.

In the step (1), ball milling frequency is 20 Hz and ball milling time is 30 min.

In the step (2), heating rate of calcination is 1° C./min, calcination temperature is 850° C., and calcination time is 1 h.

In the step (3), the reducing gas is CO, calcination temperature is 850° C. and calcination time is 200 min.

The prepared catalyst is denoted as HEO-Ni-1. In the HEO-Ni-1, the molar ratio of Ni is 20% and the molar ratio of the remaining four metals is 80%.

Embodiment 3

A preparation method of a Ni-based high-entropy oxide catalyst of the embodiment 3 is distinguished from the embodiment 1 in that the metal source in the step (1) is nitrate.

In the step (1), the molar ratio of metal Ni to each of the other metals (i.e., Mg, Co, Cu and Zn) in the step (1) is 18:1.

In the step (1), the complex is sodium citrate.

In the step (1), ball milling frequency is 50 Hz and ball milling time is 60 min.

In the step (2), heating rate of calcination is 10° C./min, calcination temperature is 1200° C., and calcination time is 6 h.

In the step (3), the reducing gas is $CH_4$, calcination temperature is 200° C. and calcination time is 20 min.

The prepared catalyst is denoted as HEO-Ni-2. In the HEO-Ni-2, the molar ratio of Ni is 82% and the molar ratio of the remaining four metals is 18%.

Comparative Example 1

A preparation method of a Ni-based high-entropy oxide catalyst of the comparative example 1 is distinguished from the embodiment 1 in that four metals of Ni, Mg, Cu and Zn are used in the step (1), and the prepared catalyst is denoted as $Ni_xMgCuZnO$.

Comparative Example 2

A preparation method of a Ni-based high-entropy oxide catalyst of the comparative example 2 is distinguished from the embodiment 1 in that four metals of Ni, Co, Cu and Zn are used in the step (1), and the prepared catalyst is denoted as $Ni_xCoCuZnO$.

Comparative Example 3

A preparation method of a Ni-based high-entropy oxide catalyst of the comparative example 3 is distinguished from the embodiment 1 in that the molar ratio of metal Ni to each of the other metals in the step (1) is 1:1 and the prepared catalyst is denoted as HEO-Ni-3.

Comparative Example 4

A preparation method of a Ni-based high-entropy oxide catalyst of the comparative example 4 is distinguished from the embodiment 1 in that the ball milling frequency is 10 Hz and the ball milling time is 20 min in the step (1) and the prepared catalyst is denoted as HEO-Ni-4.

Comparative Example 5

A preparation method of a Ni-based high-entropy oxide catalyst of the comparative example 5 is distinguished from the embodiment 1 in that heating rate of calcination is 10° C./min, calcination temperature is 800° C., and calcination time is 1 h in the step (2) and the prepared catalyst is denoted as HEO-Ni-5.

The catalysts obtained from the above embodiments and comparative examples are applied to prepare syngas by $CO_2$ reforming of $CH_4$. The specific steps are shown in the embodiment 1 and the effects are shown in Table 1.

To evaluate the reaction catalytic performance of the catalyst samples obtained from all the embodiments and comparative examples, the reaction is carried out in a fixed bed reactor with continuous flow of gas, with 0.05 grams of catalyst loaded in a quartz tube with a small tube size ratio, and under the reaction conditions of 750° C., $CO_2$:$CH_4$:nitrogen ($N_2$)=1:1:8 (V:V:V), atmospheric pressure, and a space velocity of 14,400 $mL·g^{-1}·h^{-1}$. The gas after the reaction is detected and analyzed by gas chromatography. The reaction results are shown in the Table 1.

TABLE 1

| Sample name | $CH_4$ conversion rate (%) | | $CO_2$ conversion rate (%) | |
|---|---|---|---|---|
| | 12 h | 100 h | 12 h | 100 h |
| HEO-Ni | 77.8 | 81.3 | 91.5 | 92.3 |
| HEO-Ni-1 | 78.2 | 80.4 | 90.6 | 91.3 |
| HEO-Ni-2 | 77.3 | 80.6 | 91.8 | 92.1 |
| $Ni_xMgCuZnO$ | 43.4 | 13.8 | 48.9 | 15.7 |
| $Ni_xCoCuZnO$ | 34.7 | 7.8 | 40.6 | 9.2 |
| HEO-Ni-3 | 68.4 | 46.3 | 73.8 | 55.6 |
| HEO-Ni-4 | 52.1 | 43.9 | 67.4 | 45.9 |
| HEO-Ni-5 | 37.5 | 6.3 | 48.4 | 13.5 |

Figure 3:
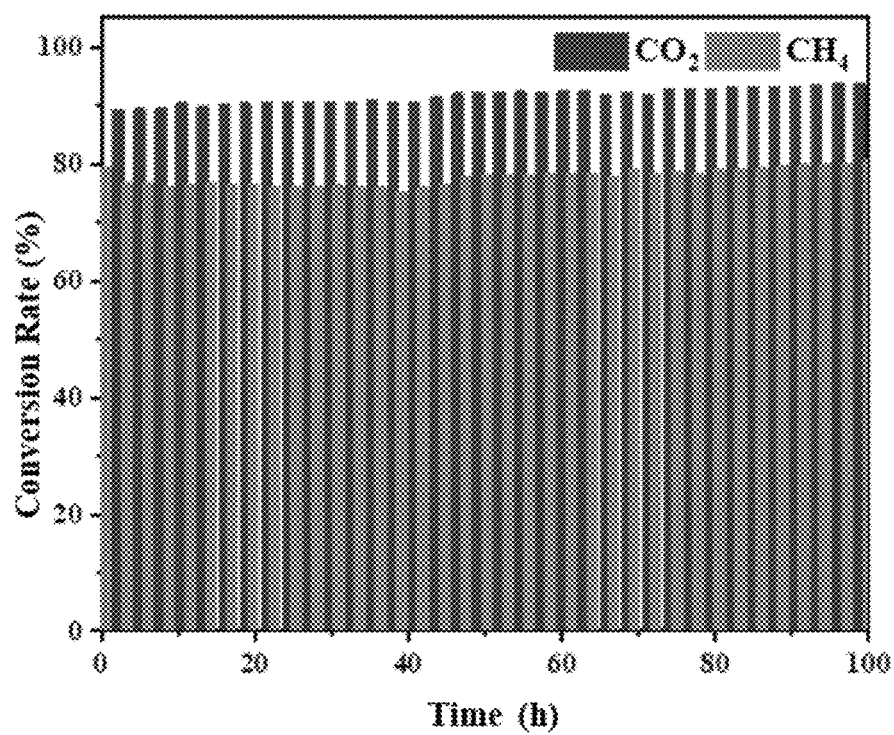
FIG. 3 illustrates a stability test diagram of the high-entropy oxide catalysts for $CO_2$ reforming of $CH_4$.

As can be seen from the Table 1, the Ni-based catalysts for $CO_2$ reforming of $CH_4$ prepared according to the preparation methods provided in the embodiments 1-3 of the disclosure have high reactivity in the $CO_2$ reforming of $CH_4$ reaction to prepare syngas, much higher than that of the comparative examples 1-5. As can be seen in FIG. 3, the catalysts still maintain good activity and stability after running 100 h.

In conclusion, the disclosure provides the preparation method of the Ni-based high-entropy oxide catalyst. A novel Ni-based oxide catalyst is constructed by using the configurational entropy strategy. The synthesized Ni-based catalyst can generate reversible Ni particles in reducing atmosphere, and its reversibility is demonstrated by the fact that the formed Ni particles can be revert back to high-entropy oxides after oxidation. The reversible Ni particles can prevent the catalyst from sintering and simultaneously complete the regeneration of the catalyst. Through a simple solid ball milling method, a large number of catalysts are prepared at one time. The catalysts containing reversible Ni particles successfully solve the problem of catalysts deactivation in $CO_2$ reforming of $CH_4$, and greatly improve the service life and its catalytic efficiency.

Those skilled in the art should recognize that the above embodiments are used only to illustrate the disclosure and are not intended to be used as a limitation of the disclosure, as long as it is within the scope of the substantive spirit of the disclosure, any appropriate changes and modifications made to the above embodiments fall within the scope of protection claimed by the disclosure.

What is claimed is:

1. A preparation method of a nickel (Ni)-based high-entropy oxide catalyst, comprising the following steps:
    (1) mixing powders of metal sources of magnesium, zinc, cobalt and copper with a complexing agent and metal Ni to obtain a mixed product, and then ball milling the mixed product at a frequency of 20-50 hertz (Hz) for 30-60 minutes (min) to obtain a precursor;
    (2) calcining the precursor obtained in the step (1) at high temperature to obtain Ni-based high-entropy oxide catalyst powder; and
    (3) calcining the Ni-based high-entropy oxide catalyst powder obtained in the step (2) in a reducing gas to form reversible Ni particles, so as to obtain the Ni-based high-entropy oxide catalyst;
    wherein in the step (1), a molar ratio of the metal Ni to each of the magnesium, the zinc, the cobalt and the copper is in a range of 2.6:1 to 18:1;
    wherein in the step (1), the complexing agent is one or more selected from the group consisting of sodium citrate, citric acid, diethanolamine, ethylenediamine tetraacetic acid, acetylacetone, dithizone and sodium triphosphate; and
    wherein in the step (2), high temperature of the calcining is in a range of 850-1200 Celsius degrees (° C.), calcination time is in a range of 1-6 hours (h), and heating rate during calcination is in a range of 1-10 Celsius degrees per minute.

2. The preparation method of the Ni-based high-entropy oxide catalyst as claimed in claim 1, wherein in the step (1), the metal source is one or more selected from the group consisting of oxide, chloride, acetate, nitrate, carbonate, sulfate, sulfite, ammonium oxalate, citrate, and gluconate.

3. The preparation method of the Ni-based high-entropy oxide catalyst as claimed in claim 1, wherein in the step (3), the reducing gas is hydrogen, methane ($CH_4$), or carbon monoxide; calcination temperature is in a range of 200-850° C., and calcination time is in a range of 20-200 min.

4. The Ni-based high-entropy oxide catalyst, prepared using the preparation method as claimed in claim 1.

5. An application of the Ni-based high-entropy oxide catalyst in preparation of syngas by carbon dioxide ($CO_2$) reforming of $CH_4$ as claimed in claim 4, wherein in the application, a volume ratio of the $CO_2$ to the $CH_4$ is in a range of 0.8-1.2, reaction temperature is in a range of 650-850° C., reaction pressure is in a range of atmospheric pressure to 2 megapascals (MPa), and space velocity of a reaction feed gas is in a range of 3,000-60,000 milliliters per gram per hour ($mL \cdot g^{-1} \cdot h^{-1}$).

\* \* \* \* \*